Aug. 25, 1936.   J. G. FORD   2,051,941
BORIC ACID EYECUP OR THE LIKE
Filed Aug. 25, 1934

INVENTOR
James G. Ford
BY
O.B.Buchanan
ATTORNEY

Patented Aug. 25, 1936

2,051,941

UNITED STATES PATENT OFFICE 2,051,941

BORIC ACID EYECUP OR THE LIKE

James G. Ford, Forest Hills, Pa.

Application August 25, 1934, Serial No. 741,414

5 Claims. (Cl. 128—249)

My invention relates to eyecups or other receptacles or vessels for sterilizing or therapeutic purposes, and it has particular reference to such vessels made of mechanically pressed and molded boric acid, or in general, made of some antiseptic, sterilizing or therapeutic material which is slightly soluble so that it is gradually dissolved away during the course of a finite number of brief periods of uses as a temporary container of water or other liquid solvent.

My principal object is to make a vessel or container out of boric acid, which has a peculiar characteristic whereby it can be placed, in powder form, in a hydraulic press, and molded into a solid, compact mass of great uniformity of structure, having a beautiful glossy surface, and having considerable strength. The resulting product is a material of small cost, amounting to only a few cents per pound, and of a very low specific gravity, approximately half that of aluminum, so that even large basins or other receptacles can be made therefrom at a trifling cost.

According to my invention, a fresh boric-acid solution is obtained by simply placing a little warm water in the vessel and agitating it for a few moments. In this way, with water at 50° C., thirty-seconds agitation in a boric-acid eyecup, for example, will provide a solution which is about 50 percent saturated at room temperature. This is just about right for an eye wash, which should be between about 50 percent and 92 percent saturated, or between about 2½ percent and 4½ percent boric acid by weight. A saturated solution is 4.9 grams per 100 grams of water at 21° C.

Other uses of my invention are for sterilizing wounds, a foot-wash, infant-wash, sterilizing bandages, dishes, or instruments, and the like. A small, shallow container made of pressed boric acid may be readily carried in a purse or first-aid kit, and used to make a fresh boric-acid solution which may be applied to a small cut or other wound by being pressed against the flesh over the injured place, to hold the solution directly against the wound for a while.

In its broader aspects, my invention contemplates the use of materials other than boric acid, although my preferred material has many advantages, including its not-too-common property of satisfactorily hardening in the dry, cold state in a hydraulic press, becoming a firm, hard solid which does not disintegrate, or become porous, or crumbly, or streakily dissolved, when put to my intended use as herein described.

Referring to the drawing.

Figure 1:
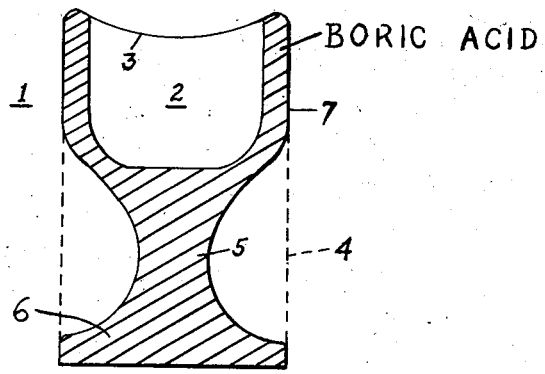
Fig. 1 is a sectional view of an eye cup embodying my invention.

Fig. 1 shows an eye cup 1 which is made by compressing ordinary powdered boric acid in a hydraulic press shaped to form the cup-part 2 and the concave rim 3 to fit the orbit of the eye.

In many cases, I prefer not to attempt to mold too complicated a shape, as the material does not flow too readily in the mold. In the case of the eyecup shown in Fig. 1, the lower portion of the cup is molded in cylindrical formation in the hydraulic press, as indicated by the dotted lines 4, and afterwards turned on a lathe to form the stem 5 and the base 6, the material being readily fashioned in this manner.

The molded boric acid may be used either pure, or as a medium for carrying small quantities or admixtures of other more powerful antiseptic materials, such as a phenol, cresol, sodium borate, and many others.

My molded boric-acid receptacle may be used either pure, that is, with unprotected outer surface, or it may be provided with a protective outside covering 7, of a substantially water-insoluble coating-material, such as pyroxylin, cellulose acetate, or other water-insoluble lacquers.

Figure 2:
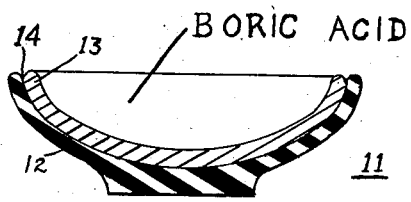
Fig. 2 is a sectional view of a two-part dish embodying my invention.

A second alternative is illustrated in Fig. 2, which shows a two-part sterilizing or therapeutic receptacle 11, comprising an outer container 12 of relatively permanent or insoluble material, such as molded beetle resin (urea-formaldehyde), bakelite (phenol-formaldehyde), or any other convenient material, and a boric-acid refill 13, which constitutes a renewable nested inner container made of a self-sustaining, slightly soluble, sterilizing or therapeutic material, such as pressed boric acid. Preferably, the two containers 12 and 13 are joined together, as by means of an interposed layer 14 of a suitable waterproof cement such as shellac, or gum mastic, or gum sandarac.

My boric-acid receptacles, even when made with reasonably thin walls, certainly not extraordinarily thick walls, are good for some two hundred or more brief periods of use as a temporary container of a liquid solvent such as water, whether used as an eyecup, wash basin, or for any similar purpose.

While I have illustrated my invention in two forms of applications, it will be obvious that such forms are only suggestive and that I am by no means limited thereto, either as to shape or material. I desire, therefore, that the appended claims shall be accorded the broadest construction consistent with their language and the prior art.

I claim as my invention:

1. An eyecup made of a self-sustaining solid material composed mainly of pressed boric acid.

2. A therapeutic receptacle made of a self-sustaining solid material composed mainly of pressed boric acid.

3. A therapeutic receptacle made of a self-sustaining solid material composed mainly of pressed boric acid and having a protective outside covering of a substantially water-insoluble coating-material.

4. A two-part therapeutic receptacle comprising an outer container of relatively permanent material and a renewable nested inner container made of a self-sustaining solid material composed mainly of pressed boric acid.

5. A therapeutic receptacle made of a self-sustaining solid material composed of pressed boric acid as a binder and an additional material admixed therewith.

JAMES G. FORD.